Feb. 15, 1949.  P. J. ULICK  2,461,946
TOOLHOLDER
Filed May 17, 1945  2 Sheets-Sheet 1

INVENTOR.
Peter J. Ulick.
BY
Gray & Smith
ATTORNEYS.

Feb. 15, 1949. P. J. ULICK 2,461,946
TOOLHOLDER
Filed May 17, 1945 2 Sheets-Sheet 2
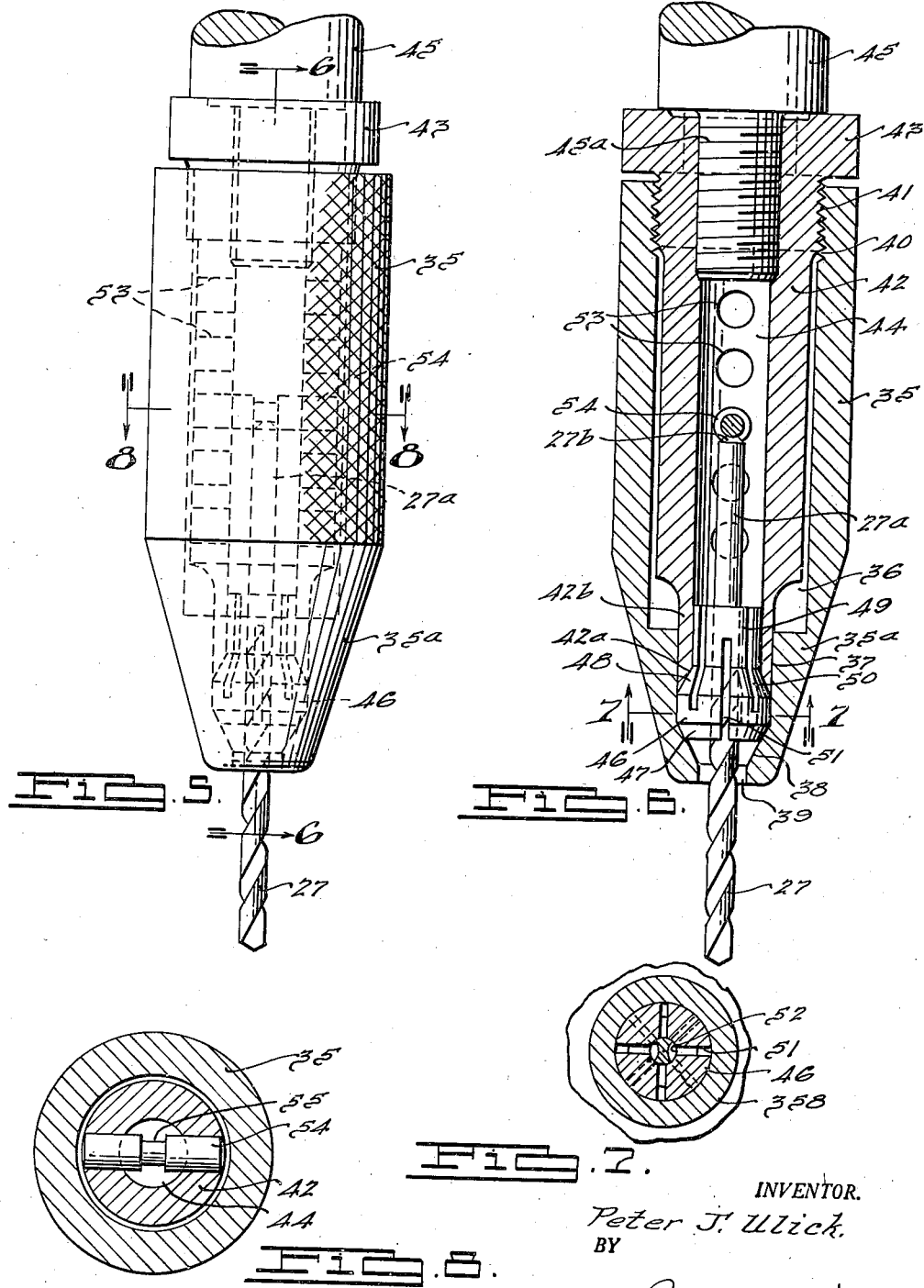
INVENTOR.
Peter J. Ulick.
BY
Grany & Smith
ATTORNEYS.

Patented Feb. 15, 1949

2,461,946

UNITED STATES PATENT OFFICE 2,461,946

TOOLHOLDER

Peter J. Ulick, Detroit, Mich., assignor to Briggs Manufacturing Company, Detroit, Mich., a corporation of Michigan Application May 17, 1945, Serial No. 594,356

4 Claims. (Cl. 279—56)

This invention relates to tool holders and more particularly to improvements in drill chucks or collet mechanism for removably positioning and clamping drills or other tools in position for operation. An object of the invention is to provide an improved tool holder, such as one for holding a drill, which is relatively simple in construction, easy to manipulate and by means of which the drill or other tool may be readily and effectively clamped in the desired operative position.

A further object of the invention is to provide an improved tool holder or drill chuck having an expansible and contractible collet and improved means for supporting and operating the same to grip or release the drill together with means whereby the position of the drill in the holder and the distance it projects therefrom may be readily predetermined, thus enabling the depth of entry of the drill into the work to be adjusted or varied as desired to suit operating requirements.

Other objects of this invention will appear in the following description and appended claims, reference being had to the accompanying drawings forming a part of this specification wherein like reference characters designate corresponding parts in the several views.

Fig. 5 is a side elevation of a drill chuck constructed in accordance with another embodiment of the invention.

Fig. 6 is a section taken substantially through lines 6—6 of Fig. 5 looking in the direction of the arrows.

Fig. 7 is a section taken substantially through lines 7—7 of Fig. 6 looking in the direction of the arrows.

Fig. 8 is a section taken substantially through lines 8—8 of Fig. 5 looking in the direction of the arrows.

Figure 1:
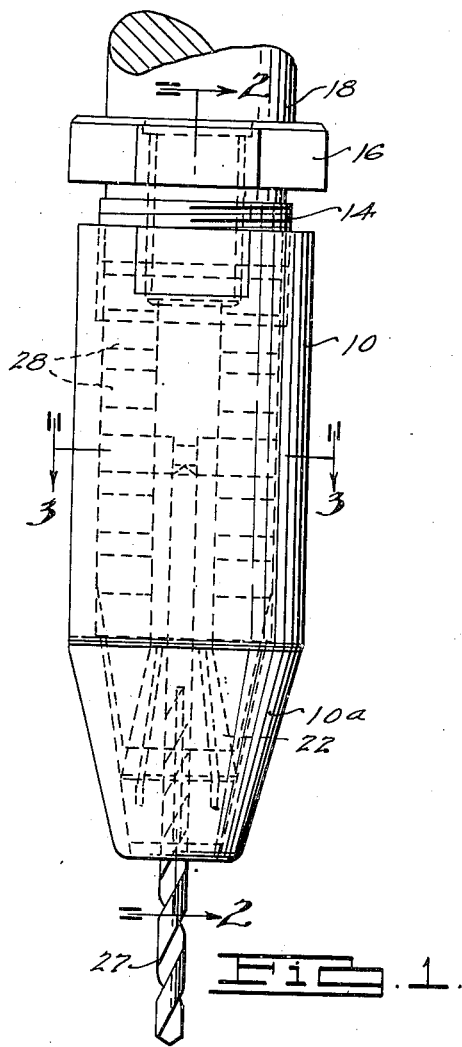
Fig. 1 is a side elevation illustrating a drill chuck constructed in accordance with one embodiment of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figs. 1 to 4 inclusive wherein there is illustrated, by way of example, one embodiment of the present invention as applied to a drill chuck, the tool holding device therein shown comprises an outer cylindrical sleeve 10 terminating at its outer or lower end in a tapered nose 10a formed with an inner tapered or frusto-conical wall 11 extending to the opening 10b at the terminal end of the tapered nose 10a. Above the taper 11 the sleeve 10 is provided with a cylindrical bore 12 tapped at its upper or inner end to provide threads 13 adapted to receive the exteriorly threaded portion 14 of a shiftable cylindrical holder or collet operating member 15. The member 15 beyond the threaded portion 14 is provided with an enlarged head 16 formed with flats for the reception of a wrench. The member 15 is also bored and tapped axially to receive the reduced threaded end 17 of a rotary spindle or arbor 18 mounted in a drill press of any conventional type.

The lower or outer end of the inner member 15 of the device has a longitudinal taper 15a adapted to extend within the tapered portion 11 of the sleeve 10 and suitably spaced therefrom, as indicated at 19, when the parts are assembled. The member 15 is provided with an axially extending cylindrical bore 20 of suitable diameter terminating in a flared portion 21 having straight tapered walls, and this flared end portion of the member 15 is adapted to receive and engage a correspondingly tapered portion 22 of a collet which has a reversely tapered nose or end portion 23 adapted to fit smoothly within the tapered portion 11 of the sleeve 10. The wall of the collet is formed with longitudinally extending through slots 24 and 25 each of which extends through one terminal end of the collet while terminating short of the opposite end. The collet thus comprises yieldable segments terminating in a central bore or hole 26 adapted to receive a tool, such as a drill 27. When the collet is in normally expanded condition, the drill may be freely inserted through the hole 26 with the shank 27a of the drill extending into the bore 20 in the collet operating member or holder 15.

The member 15 is drilled transversely to provide a suitable number of space holes 28 extending entirely through the walls of the member 15 so as to intersect the major axis thereof. A cylindrical locator pin 29 is adapted to be inserted into any one of the transverse holes 28 with a free sliding fit therein. This pin at its center is machined to provide an annular notch or groove 30 into which the reduced tapered end 27b of the drill shank is adapted to fit. Thus, it will be seen that the distance which the drill shank projects into the bore 20 in the member 15 and, hence, the distance to which the drill projects beyond the collet, will be determined by the position of the retainer pin 29 and the particular hole 28 in which the pin lies when the parts are assembled. The pin 29 is first positioned in one of the holes 28 as predetermined by the depth to which the drill is to enter the work, and thereatfer with the collet positioned within the sleeve the latter is assembled over the member 15 and screwed onto the threaded portion 14 thereof.

Figure 2:
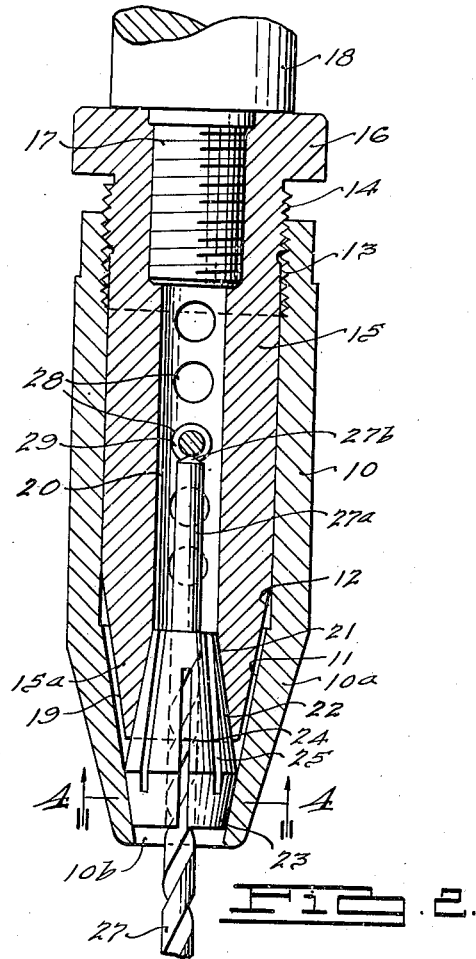
Fig. 2 is a longitudinal sectional view taken substantially through lines 2—2 of Fig. 1 looking in the direction of the arrows.
Figure 3:
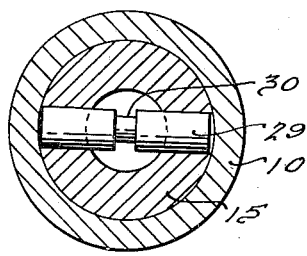
Fig. 3 is a section taken substantially through lines 3—3 of Fig. 1 looking in the direction of the arrows.
Figure 4:
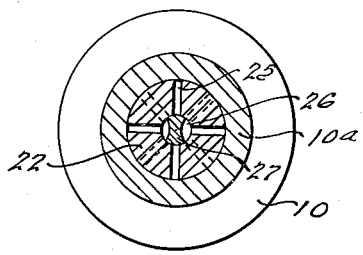
Fig. 4 is a section taken substantially through lines 4—4 of Fig. 2 looking in the direction of the arrows.

It will be seen that when the sleeve and collet 15 are assembled, as in the manner shown in Fig. 2, the ends of the holes 28 will be covered by the sleeve 10 and, hence, the retainer pin 29, positioned in one of these holes, will be held by the sleeve against shiftable movement in either direction. With the sleeve, holder and collet thus initially assembled, the drill is inserted through the collet and the upper end 27b thereof engaged within the notch or groove 30 in the retainer pin. Thereupon the sleeve is drawn up onto the threaded portion 14 thereby relatively shifting the members 10 and 15 in an endwise direction. The tapered end 23 of the collet is contracted by the engagement with the tapered wall 11 of the sleeve and the reversely tapered end 22 of the collet is contracted by engagement with the tapered wall 21 of the member 15. The collet is thus contracted or compressed uniformly thereby causing it to clamp or grip firmly the drill 27.

The drill chuck illustrated in the embodiment of Figs. 5 to 8 inclusive also comprises an outer sleeve 35 terminating in a tapered nose 35a and having an inner cylindrical bore 36. Extending from the bore 36 is a counterbore 37 of smaller diameter which terminates in an inwardly tapered portion 38 communicating with an axial opening 39 in the end of the sleeve 35. The sleeve at its opposite end has internal threads 40 cooperable with an externally threaded portion 41 of a cylindrical collet holder or operating member 42 adapted to extend within the bore 36 in spaced relation to the inner walls thereof. The member 42 also terminates in an enlarged head 43 provided with flats for the reception of a wrench. The holder 42 has an axially extending bore 44 terminating at its upper end in a counterbore which is tapped to receive the threaded end 45a of a rotatable spindle or arbor 45 mounted in the drill press.

Adapted to be received within the bore 37 of the sleeve 35 is a collet having an intermediate cylindrical portion 46 fitting within the bore 37. The collet is provided with a tapered portion 48 coacting with a correspondingly tapered end portion 42a of the member 42. Thence the collet is provided with a cylindrical extension 49 adapted to fit within the bore 44. At its opposite or outer end the collet has a tapered portion 47 adapted to engage the correspondingly tapered bore 38 of the outer sleeve 35. As in the previous embodiment, the collet is formed with through slots 50 and 51 which extend alternately through opposite ends of the collet, thus providing expansible and contractible segments having therebetween an axial bore or hole 52 to receive the drill 27.

As in the previous embodiment, the collet member 42 is drilled to provide a series of vertically spaced transverse holes 53 through any one of which may be inserted a cylindrical retainer or locator pin 54 machined centrally to provide an annular groove or notch 55 into which the tapered end 27b of the collet shank is adapted to fit when the parts are assembled. It will be seen that by drawing the sleeve 35 onto the threaded end 41 of the collet member 42 the collet will be contracted to grip the drill by engagement of the tapered portion 47 of the collet with the tapered end wall 38 and by engagement of the tapered end 42a of the member 42 with the tapered portion 48 of the collet.

I claim:

1. A holding device for a drill or other tool, comprising outer and inner tubular members having a threaded connection therebetween for relatively shifting the members endwise, the outer member projecting beyond the inner member, a contractible collet, said members having internal reversely tapered portions adapted to embrace and engage reversely formed externally tapered portions of the collet and operative simultaneously to contract the collet to grip the tool when said members are screwed together, said inner member having a longitudinal bore to receive the tool and a plurality of transverse holes intersecting the central longitudinal axis thereof, and a pin insertable into any one of said holes and recessed to receive the terminal end of the tool and held in position by the outer member against withdrawal.

2. A holding device for a drill or other tool, comprising a contractible collet for gripping the tool, a pair of tubular telescoped members each having a tapered portion engaging a tapered portion of the collet, means for relatively shifting said members endwise to contract the collet by engagement of said tapered portions, said inner member having a plurality of longitudinally spaced centrally arranged transverse holes, and a pin insertable selectively in said holes and abutting against the terminal end of the tool and held against withdrawal from each hole by the outer member when the members are in telescoped relation, said pin having an annular groove receiving the terminal end of the tool.

3. A drill chuck or the like, comprising a pair of telescoped tubular members having a threaded connection adjacent the inner ends thereof for relatively shifting the members endwise, a contractible collet having adjacent reversely tapered exterior surfaces, said members having longitudinally spaced reversely tapered bore portions adjacent their outer ends engaging said surfaces and cooperable therewith to contract the collet to grip a drill when said members are screwed together, and a removable pin insertable into any one of a plurality of centrally arranged transverse holes in the inner member for positioning the inner end of the drill said pin having a central annular groove receiving the terminal end of the drill.

4. A drill chuck or the like, comprising a pair of telescoped tubular members having a threaded connection adjacent the inner ends thereof for relatively shifting the members endwise, a contractible collet having adjacent reversely tapered exterior surfaces, said members having longitudinally spaced reversely tapered bore portions adjacent their outer ends engaging said surfaces and cooperable therewith to contract the collet to grip a drill when said members are screwed together, and a removable pin insertable into any one of a plurality of centrally arranged transverse holes in the inner member for positioning the inner end of the drill, said pin being held by the outer member against withdrawal from each hole when the members are assembled and having a central notched portion receiving the terminal end of the drill.

PETER J. ULICK.

REFERENCES CITED

The following references are of record in the file of this patent:

UNITED STATES PATENTS

| Number | Name | Date |
|---|---|---|
| 132,541 | Peckham | Oct. 27, 1872 |
| 339,595 | Stone | Apr. 6, 1886 |
| 876,016 | Rich | Jan. 7, 1908 |
| 993,382 | Kimman | May 30, 1911 |
| 1,883,713 | Gray | Oct. 18, 1932 |

FOREIGN PATENTS

| Number | Country | Date |
|---|---|---|
| 96,151 | Germany | July 4, 1939 |
| 735,206 | France | Nov. 4, 1932 |

OTHER REFERENCES

Amer. Mach., dated 6-16-21—page 57.

Amer. Mach., vol. 55, No. 3, page 11 (copy of which is in 279-46—Division 52).